United States Patent
Price et al.

(10) Patent No.: US 6,426,821 B1
(45) Date of Patent: Jul. 30, 2002

(54) OPTICAL UPCONVERTER APPARATUSES, METHODS AND SYSTEMS

(75) Inventors: Alistair J. Price; Thomas D. Stephens, both of Columbia, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/544,482

(22) Filed: Apr. 7, 2000

Related U.S. Application Data

(63) Continuation of application No. 09/185,820, filed on Nov. 4, 1998, now Pat. No. 6,118,566.

(51) Int. Cl.[7] ............................................. H04B 10/00
(52) U.S. Cl. ...................... 359/156; 359/122; 359/140; 359/181; 359/188; 359/250; 359/254; 359/256; 359/259; 385/11; 385/42; 385/44; 385/45; 385/46; 385/47
(58) Field of Search ................................. 359/140, 156, 359/188, 181, 122, 250, 254, 259, 276; 385/11, 42, 44–47

(56) References Cited

U.S. PATENT DOCUMENTS

| | | | |
|---|---|---|---|
| 3,699,480 A | | 10/1972 | Mueller |
| 3,956,626 A | * | 5/1976 | Rose ........................... 250/199 |
| 4,663,596 A | | 5/1987 | Heeks |
| 4,666,255 A | | 5/1987 | Taylor et al. |
| 4,684,215 A | | 8/1987 | Shaw et al. |
| 4,897,622 A | | 1/1990 | Cheo et al. |
| 4,989,200 A | | 1/1991 | Olshansky et al. |
| 5,101,450 A | | 3/1992 | Olshansky |
| 5,111,322 A | * | 5/1992 | Bergano et al. ............. 359/122 |
| 5,115,440 A | | 5/1992 | Gysel et al. |
| 5,134,509 A | | 7/1992 | Olshansky et al. |
| 5,239,401 A | | 8/1993 | Olshansky |
| 5,249,201 A | | 9/1993 | Posner et al. |

(List continued on next page.)

FOREIGN PATENT DOCUMENTS

| | | |
|---|---|---|
| EP | 0484791 B1 | 12/1995 |
| JP | 04074034 | 3/1992 |
| JP | 10056661 A | 2/1998 |

OTHER PUBLICATIONS

Hall, K.L. et al., 100 Gb/s All–Optical Logic, OFC '98 Post–Deadline Paper PD5–1–PD5–3.

Iwashita, Katsushi and Takachio, Noboru, Chromatic Dispersion Compensation in Coherent Optical Communications, Mar. 1990, pp. 367–374, Journal of Lightwave Technology.

Alferness, Rod C. and Koch, Thomas L., Dispersion Compensation by Active Predistorted Signal Synthesis, Aug. 1985, pp. 800–805, Journal of Lightwave Technology.

Johnstone, W. et al., Integrated Optical Frequency Translators, IEE Colloquim on "Advances in Coherent Optic Devices and Technologies", p. 211–216. (Mar. 26, 1985.

Royset, A., et al., "Compensation of Optical Fibre Dispersion in the Electrical Domain for Transmission Systems with Direct Detection", Electronics Letters, Jan. 20, 1994, vol. 30, No. 2, pp. 152–153.

*Primary Examiner*—Leslie Pascal
*Assistant Examiner*—Hanh Phan

(57) ABSTRACT

Apparatuses, methods, and systems are disclosed that provide for simultaneously upconverting electrical signals carrying information at electric frequencies onto optical subcarrier lightwave frequencies that are greater and less than the carrier frequency of the lightwave onto which the electrical frequencies were upconverted. The upconversion of the electrical signals can be performed with or without suppression of the optical carrier frequency.

17 Claims, 12 Drawing Sheets

U.S. PATENT DOCUMENTS

| | | | |
|---|---|---|---|
| 5,278,923 A | | 1/1994 | Nazarathy et al. |
| 5,301,058 A | * | 4/1994 | Olshansky .................. 359/188 |
| 5,304,945 A | * | 4/1994 | Myer ......................... 330/149 |
| 5,394,261 A | | 2/1995 | Nakamura |
| 5,418,637 A | | 5/1995 | Kuo |
| 5,432,632 A | | 7/1995 | Watanabe |
| 5,434,937 A | | 7/1995 | Glance |
| 5,446,574 A | | 8/1995 | Djupsjobacka et al. |
| 5,453,868 A | | 9/1995 | Blauvelt et al. |
| 5,526,159 A | | 6/1996 | Gottwald |
| 5,543,952 A | | 8/1996 | Yonenaga et al. |
| 5,555,118 A | | 9/1996 | Huber |
| 5,596,436 A | | 1/1997 | Sargis et al. |
| 5,734,493 A | | 3/1998 | Jopson |
| 5,777,771 A | | 7/1998 | Smith |
| 5,778,128 A | | 7/1998 | Wildeman |
| 5,781,673 A | | 7/1998 | Reed et al. |
| 5,787,211 A | | 7/1998 | Gopalakrishnan |
| 5,798,854 A | | 8/1998 | Blauvelt et al. |
| 5,801,871 A | | 9/1998 | Madabhushi |
| 5,812,294 A | | 9/1998 | Wilson |
| 5,850,305 A | | 12/1998 | Pidgeon |
| 5,870,213 A | | 2/1999 | Ishikawa et al. |
| 5,900,957 A | * | 5/1999 | Van Der Tol ............... 359/139 |
| 5,909,297 A | | 6/1999 | Ishikawa et al. |
| 5,917,638 A | * | 6/1999 | Franck et al. ............... 359/181 |
| 5,930,414 A | * | 7/1999 | Fishman et al. .............. 385/11 |
| 5,999,300 A | | 12/1999 | Davies et al. |
| 5,999,667 A | | 12/1999 | Castoldi et al. |
| 6,005,701 A | | 12/1999 | Hardy et al. |
| 6,046,838 A | | 4/2000 | Kou et al. |
| 6,118,566 A | * | 9/2000 | Price .......................... 359/181 |
| 6,141,127 A | | 10/2000 | Boivin et al. |

\* cited by examiner

OPTICAL UPCONVERTER APPARATUSES, METHODS AND SYSTEMS

CROSS-REFERENCE TO RELATED APPLICATIONS

This application is a continuation application of U.S. patent application Ser. No. 09/185,820 filed Nov. 4, 1998, now U.S. Pat. No. 6,118,566 which is incorporated herein by reference, and which therefor is related to commonly assigned U.S. patent applications entitled "Optical Transmission Apparatuses, Methods, and Systems", Docket No. 981104OT and "Optical Distortion Compensation Apparatuses, Methods, and Systems", Docket No. 981104OD, which are filed concurrently herewith and are incorporated herein by reference.

STATEMENT REGARDING FEDERALLY SPONSORED RESEARCH OR DEVELOPMENT

Not Applicable

BACKGROUND OF THE INVENTION

The present invention is directed generally to the transmission of information in communication systems. More particularly, the invention relates to transmitting information via optical signals in optical transmission systems and transmitters for use therein.

The development of digital technology provided resources to store and process vast amounts of information. While this development greatly increased information processing capabilities, it was soon recognized that in order to make effective use of information resources, it was necessary to interconnect and allow communication between information resources. Efficient access to information resources requires the continued development of information transmission systems to facilitate the sharing of information between resources.

The continued advances in information storage and processing technology has fueled a corresponding advance in information transmission technology. Information transmission technology is directed toward providing high speed, high capacity connections between information resources. One effort to achieve higher transmission capacities has focused on the development of optical transmission systems for use in conjunction with high speed electronic transmission systems. Optical transmission systems employ optical fiber networks to provide high capacity, low error rate transmission of information over long distances at a relatively low cost.

The transmission of information over fiber optic networks is performed by imparting the information in some manner to a lightwave carrier by varying the characteristics of the lightwave. The lightwave is launched into the optical fiber in the network to a receiver at a destination for the information. At the receiver, a photodetector is used to detect the lightwave variations and convert the information carried by the variations into electrical form.

In most optical transmission systems, the information is imparted by using the information data stream to either modulate a lightwave source to produce a modulated lightwave or to modulate the lightwave after it is emitted from the light source. The former modulation technique is known as "direct modulation", whereas the latter is known as "external modulation", i.e., external to the lightwave source. External modulation is more often used for higher speed transmission systems, because the high speed direct modulation of a source often causes undesirable variations in the wavelength of the source. The wavelength variations, known as chirp, can result in transmission and detection errors in an optical system.

Data streams can be modulated onto the lightwave using a number of different schemes. The two most common schemes are return to zero (RZ) and non-return to zero (NRZ). In RZ modulation, the modulation of each bit of information begins and ends at the same modulation level, i.e., zero, as shown in FIG. 1(a). In NRZ schemes, the modulation level is not returned to a base modulation level, i.e., zero, at the end of a bit, but is directly adjusted to a level necessary to modulate the next information bit as shown in FIG. 1(b). Other modulation schemes, such as duobinary and PSK, encode the data in a waveform, such as in FIG. 1(c), prior to modulation onto a carrier.

In many systems, the information data stream is modulated onto the lightwave at a carrier wavelength, $\lambda_c$, (FIG. 2(a)) to produce an optical signal carrying data at the carrier wavelength, similar to that shown in FIG. 2(b). The modulation of the carrier wavelength also produces symmetric lobes, or sidebands, that broaden the overall bandwidth of the optical signal. The bandwidth of an optical signal determines how closely spaced successive optical signals can be spaced within a range of wavelengths.

Alternatively, the information can be modulated onto a wavelength proximate to the carrier wavelength using subcarrier modulation ("SCM"). SCM techniques, such as those described in U.S. Pat. Nos. 4,989,200, 5,432,632, and 5,596,436, generally produce a modulated optical signal in the form of two mirror image sidebands at wavelengths symmetrically disposed around the carrier wavelength. Generally, only one of the mirror images is required to carry the signal and the other image is a source of signal noise that also consumes wavelength bandwidth that would normally be available to carry information. Similarly, the carrier wavelength, which does not carry the information, can be a source of noise that interferes with the subcarrier signal. Modified SCM techniques have been developed to eliminate one of the mirror images and the carrier wavelength, such as described in U.S. Pat. Nos. 5,101,450 and 5,301,058.

Initially, single wavelength lightwave carriers were spatially separated by placing each carrier on a different fiber to provide space division multiplexing ("SDM") of the information in optical systems. As the demand for capacity grew, increasing numbers of information data streams were spaced in time, or time division multiplexed ("TDM"), on the single wavelength carrier in the SDM system as a means to provide additional capacity. The continued growth in transmission capacity has spawned the transmission of multiple wavelength carriers on a single fiber using wavelength division multiplexing ("WDM"). In WDM systems, further increases in transmission capacity can be achieved not only by increasing the transmission rate of the information via each wavelength, but also by increasing the number of wavelengths, or channel count, in the system.

There are two general options for increasing the channel count in WDM systems. The first option is to widen the transmission bandwidth to add more channels at current channel spacings. The second option is to decrease the spacing between the channels to provide a greater number of channels within a given transmission bandwidth. The first option currently provides only limited benefit, because most optical systems use erbium doped fiber amplifiers ("EDFAs") to amplify the optical signal during transmission. EDFAs have a limited bandwidth of operation and suffer from non-linear amplifier characteristics within the bandwidth. Difficulties with the second option include controlling optical sources that are closely spaced to prevent interference from wavelength drift and nonlinear interactions between the signals.

A further difficulty in WDM systems is that chromatic dispersion, which results from differences in the speed at which different wavelengths travel in optical fiber, can also degrade the optical signal. Chromatic dispersion is generally controlled in a system using one or more of three techniques. One technique to offset the dispersion of the different wavelengths in the transmission fiber through the use of optical components such as Bragg gratings or arrayed waveguides that vary the relative optical paths of the wavelengths. Another technique is intersperse different types of fibers that have opposite dispersion characteristics to that of the transmission fiber. A third technique is to attempt to offset the dispersion by prechirping the frequency or modulating the phase of the laser or lightwave in addition to modulating the data onto the lightwave. For example, see U.S. Pat. Nos. 5,555,118, 5,778,128, 5,781,673 or 5,787,211. These techniques require that additional components be added to the system and/or the use of specialty optical fiber that has to be specifically tailored to each length of transmission fiber in the system.

New fiber designs have been developed that substantially reduce the chromatic dispersion of WDM signals during transmission in the 1550 nm wavelength range. However, the decreased dispersion of the optical signal allows for increased nonlinear interaction, such as four wave mixing, to occur between the wavelengths that increases signal degradation. The effect of lower dispersion on nonlinear signal degradation becomes more pronounced at increased bit transmission rates.

The many difficulties associated with increasing the number of wavelength channels in WDM systems, as well as increasing the transmission bit rate have slowed the continued advance in communications transmission capacity. In view of these difficulties, there is a clear need for transmission techniques and systems that provide for higher capacity, longer distance optical communication systems.

BRIEF SUMMARY OF THE INVENTION

Apparatuses and methods of the present invention address the above need by providing optical communication systems that include transmitters that can provide for pluralities of information carrying wavelengths per optical transmission source, dispersion compensation, and/or nonlinear management in the system. In an embodiment, the information data stream is electrically distorted to compensate for chromatic dispersion of a lightwave/optical signal during transmission. The electrical distortion can be used to compensate for negative or positive dispersion in varying amounts depending upon the characteristics of the optical fiber in the network and to some extent offset nonlinear interactions that produce distortion of the optical signal Electrical distortion can be specifically tailored to each wavelength and bit rate used in the optical system.

Electrical dispersion compensation can be used in conjunction with other methods, such as dispersion compensating fiber or time delay components to control the level of dispersion at various points in the network. The amount of dispersion in the system can be controlled to provide a substantially predetermined value of net dispersion, e.g., zero, at the end of a link, to provide an average value over the link, and/or to minimize the absolute dispersion at any point in the link.

Electrical distortion compensation can be used with RZ, NRZ, ASK, PSK, and duobinary formats, as well as other modulation formats and baseband and subcarrier modulation techniques. In addition, the amount of electronic distortion applied to a signal can be controlled via a feedback loop from a receiver in the system to allow fine tuning of the compensation. In this manner, changes in the network performance with time can be accommodated.

In an embodiment, an information data stream is modulated on to an electrical carrier, such radio frequency ("RF") or microwave carrier, frequency $v_e$. The modulated electrical carrier is upconverted on to a lightwave carrier having a wavelength $\lambda_0$ and frequency $v_o$ produced by the optical transmission source to produce an information carrying lightwave at wavelength $\lambda_i$ and frequency $v_{o \pm e}$. The upconverter can be used to simultaneously upconvert a plurality of electrical frequencies onto different subcarrier lightwaves. In an embodiment, the information is modulated onto the electrical carrier in duobinary format, which provides for more narrow subcarrier bandwidths.

In an embodiment, the lightwave carrier from the optical source is split into a plurality of split lightwave carriers, each of which has one or more data streams upconverted or modulated onto it. The subcarrier lightwave optical signals generated from the split lightwave optical carriers are then recombined into the optical signal for transmission. The split lightwave carrier overcomes the problem of maintaining close wavelength spacing between multiple carriers in an operating system by employing a common optical source. The optical source providing the lightwave carrier may include one or more lasers or other optical sources.

The split lightwave carrier also provides a method of placing multiple information carrying wavelengths near the lightwave carrier without having to upconvert or modulate more than one data stream at a time onto a lightwave carrier. The upconverted lightwaves can be at wavelengths that are greater and/or less than the carrier wavelength and symmetrically or asymmetrically positioned relative to the carrier wavelength. In addition, subcarriers can be simultaneously upconverted onto the same lightwave, at least one subcarrier with a higher frequency and at least one subcarrier with a lower frequency than the carrier frequency.

The upconversion of the modulated electrical carrier can be performed using double or single sideband upconverters with or without suppression of the carrier wavelength $\lambda_0$. However, the reduction or elimination of the carrier wavelength $\lambda_0$ and any mirror image sideband will eliminate unwanted signals which could interfere with the upconverted signal.

In an embodiment, a two sided, single sideband upconverter is provided to modulate multiple information data streams onto both longer and shorter wavelengths. In those embodiments, one upconverter can be used to upconvert data on equally or differently spaced subcarriers relative to the carrier wavelength.

In an embodiment, the polarization of adjacent lightwave carriers is controlled to decrease the nonlinear interactions of the signals. For example, adjacent wavelength signal can be orthogonally polarized to decrease the extent of four wave mixing that occurs between the signals during transmission. In addition, the wavelength spacing between neighboring upconverted signals can be selected to lessen nonlinear interaction effects.

Accordingly, the present invention addresses the aforementioned problems with providing increasing the number of channels and the transmission performance of optical systems. These advantages and others will become apparent from the following detailed description.

BRIEF DESCRIPTION OF THE DRAWINGS

Embodiments of the present invention will now be described, by way of example only, with reference to the accompanying drawings wherein like members bear like reference numerals and wherein.

DETAILED DESCRIPTION OF THE INVENTION

Figure 1A:
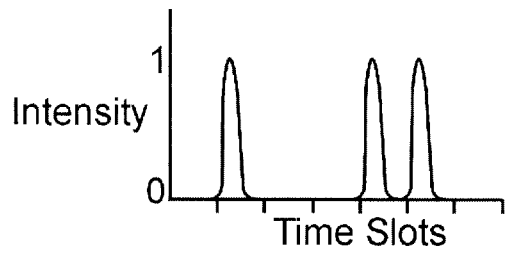
FIGS. 1(a–c) show a typical baseband return to zero ("RZ") and non-return to zero ("NRZ") data signal.
Figure 2A:
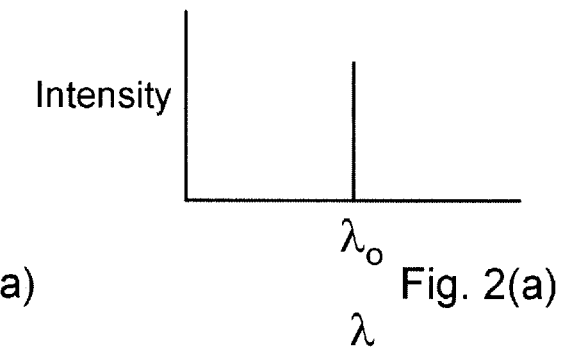
FIGS. 2(a–c) show the intensity versus wavelength plots for an unmodulated optical carrier, modulated carrier, and modulated subcarriers of the carrier.
Figure 1B:
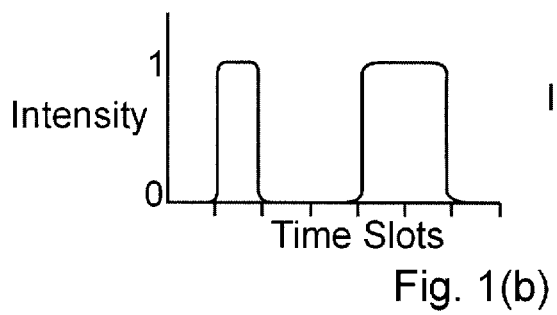
Figure 2B:
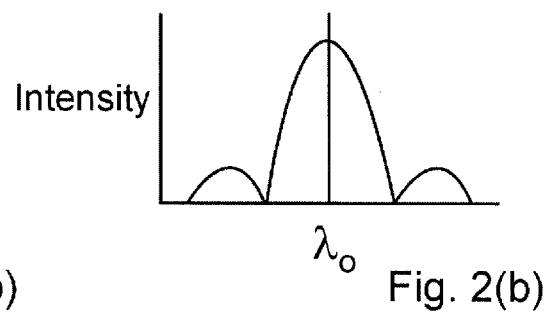
Figure 1C:
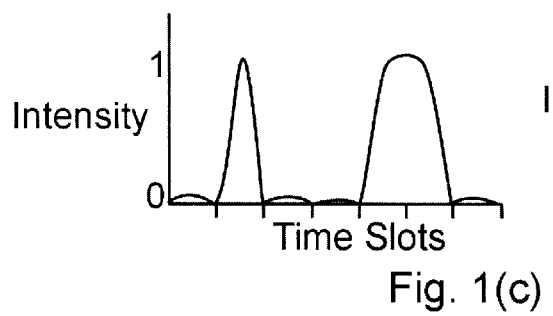
Figure 2C:
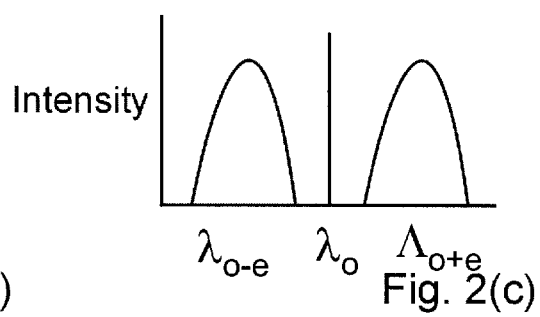
Figure 3:
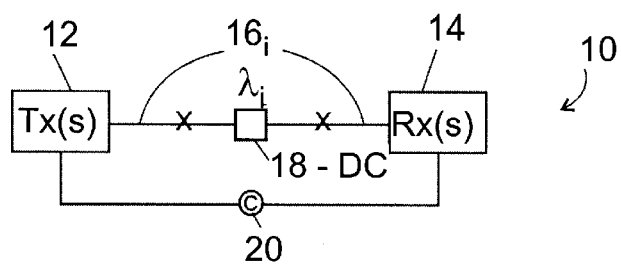
FIGS. 3–4 show embodiments of the system of the present invention.

The operation of optical systems 10 of the present invention will be described generally with reference to the drawings for the purpose of illustrating present embodiments only and not for purposes of limiting the same. As shown in FIG. 3, the system 10 includes an optical transmitter 12 configured to transmit information, i.e., data, etc., via one or more information carrying optical wavelengths $\lambda_i$ to an optical receiver 14 through one or more segments of optical fiber $16_j$. The system 10 may also include one or more dispersion compensating components 18 and feedback controllers 20, as well as other optical components such as optical amplifier 22, add/drop devices 24, and the like.

Figure 4:
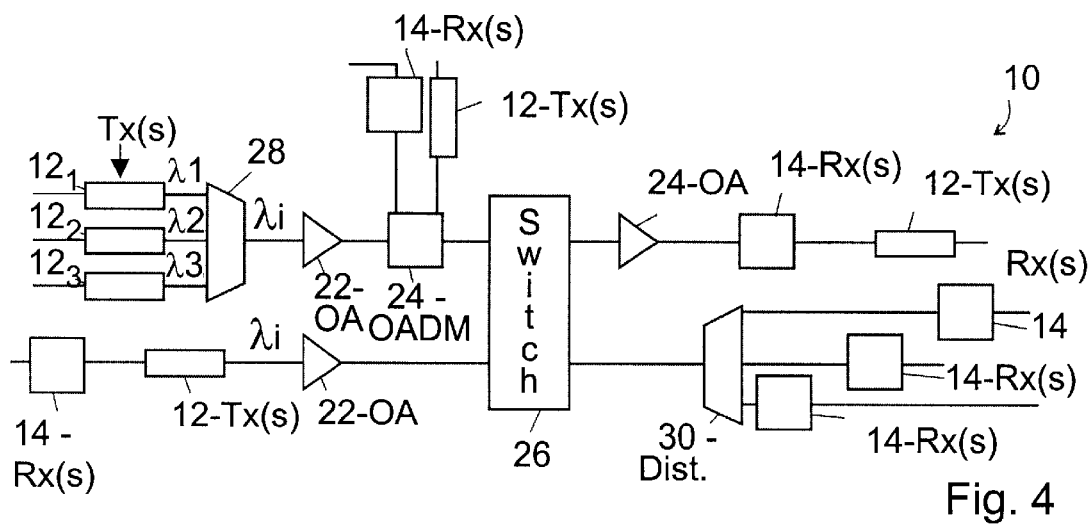

As shown in FIG. 4, the system 10 can be embodied as a network including a plurality of transmitters 12 and receivers 14 in optical communication through one or more optical switches 26, combiners 28, and/or distributors 30. For example, optical and digital cross connect switches and routers, multiplexers, splitters, and demultiplexers can be employed in the system 10. The transmitters 12 and receivers 14 can interface directly with electrical transmission systems or via electrical switches or interfaces to other optical systems that operate using the same or different wavelengths.

In an embodiment, the transmitter 12 is configured to electrically distort an electrical signal carrying data to compensate for chromatic dispersion that occurs as an optical signal $\Lambda_o$ carrying the data is transmitted through the optical fiber $16_i$. The electronic data signal $\Lambda_E$ can be in a baseband $\Lambda_B$ (i.e., binary, direct current), coded $\Lambda_c$, or a modulated electrical carrier $\Lambda_e$ format.

Figure 5:
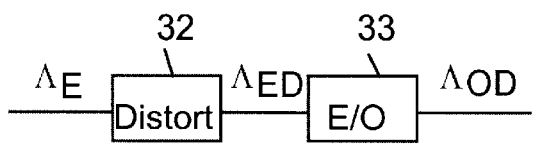
FIG. 5 shows an embodiment of a transmitter of the present invention.

In an embodiment of the transmitter 12 shown in FIG. 5, an electronic signal distorter 32 is configured to produce a distorted electrical signal $\Lambda_{ED}$. A distorted optical signal $\Lambda_{OD}$ is produced using an electrical to optical converter 33 to impart the the electrical signal $\Lambda_{ED}$ onto an optical carrier lightwave $\Lambda_O$. The electrical to optical conversion can be performed by upconverting the electrical signal $\Lambda_{ED}$ onto a subcarrier lightwave of an optical carrier lightwave $\Lambda_O$ provided by an optical source 34. Alternatively, the conversion of electrical signal $\Lambda_{ED}$ can be performed by directly modulating the optical source 34 or externally modulating the optical carrier lightwave $\Lambda_O$ to produce the optical data signal at the carrier frequency. One or more signal lasers, or other appropriate optical sources as may be known in the art, can be used as the optical source 34.

The distortion of the electronic data signal is generally in the form of an electronically induced time delay that varies as a function of the optical wavelength $\lambda_i$ in the optical signal $\Lambda_O$. The group delay can be used to provide varying amounts of dispersion compensation for each wavelength and for each bit rate in the system 10. The time delay characteristics can be controlled to provide linear and nonlinear, as well as positive, negative, and varying delay profiles with respect to the wavelength of the signal.

Figure 6A:
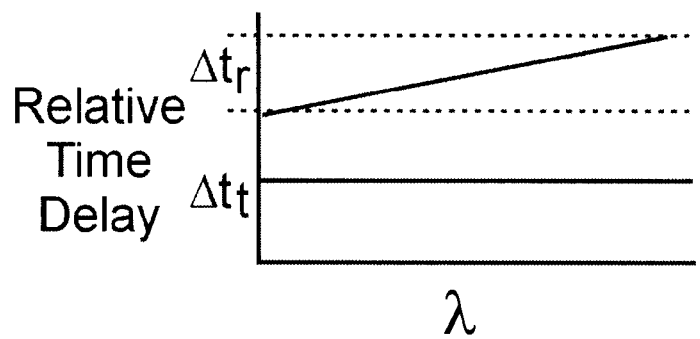
FIGS. 6(a–c) show transmission & reception time versus wavelength curves.
Figure 6B:
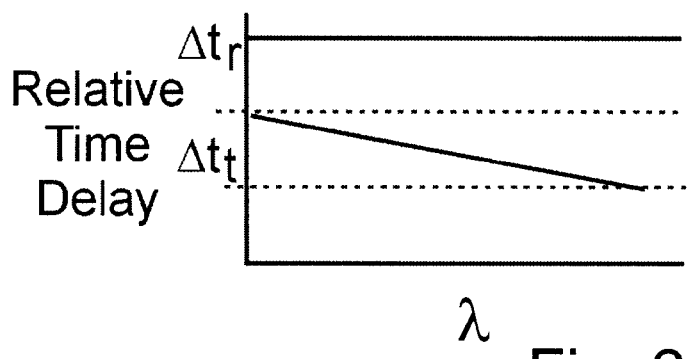
Figure 6C:
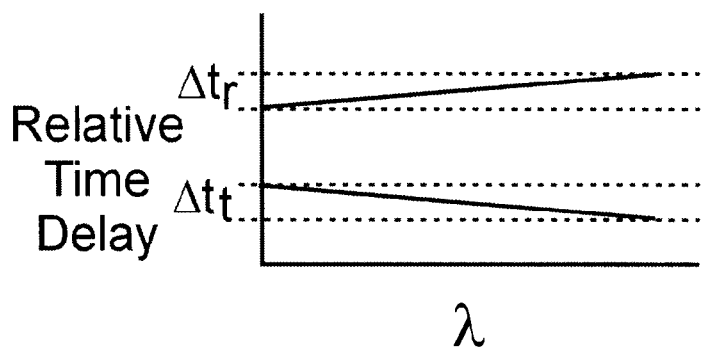

FIG. 6(a) shows an example of a typical relative time delay at the receiver versus wavelength plot for an optical signal being transmitted with zero dispersion at a transmission time $t_t$. Dispersion of the signal during transmission results in the different wavelengths in the signal reaching the receiver 14 at different time during a reception time interval, $\Delta t_r$. The time delay in signal reception is one source of signal distortion that degrades system performance. In the present invention, distorted optical signals can be produced by introducing distortion as a group delay function of frequency, which results in the signal being transmitted over a transmission time interval $\Delta t_t$. The electronic distortion is offset by dispersion in the transmission path resulting in the different frequencies reaching the receiver 14 at the same reception time $t_r$ (FIG. 6(b)), or over a reception time interval of choice (FIG. 6(c)).

One skilled in the art will appreciate that in the present invention the distortion profile of the electronic data signal can be varied as desired to control the shape of optical signal at the receiver 14. For example, given the interrelation of chromatic dispersion and nonlinear interactions, the electrical distortion characteristics can be shaped to minimize the total distortion at the receiver 14 as opposed to minimizing only the chromatic dispersion. In addition, electronic dispersion compensation can be used in conjunction with dispersion compensating elements 18, such as negative dispersion slope fiber, grating-based elements, etc. as are known in the art.

Figure 7:
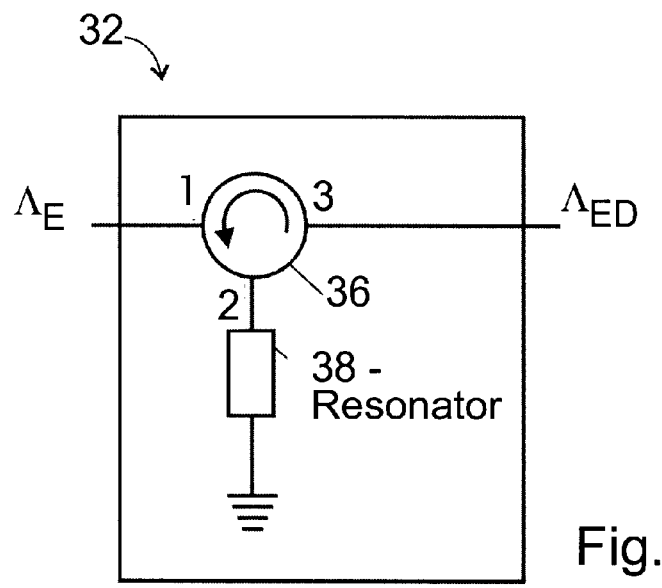
FIGS. 7(a–c) show embodiments of signal distorters of the present invention

FIGS. 7(a–c) show embodiments of signal distorter 32 of the present invention. In FIG. 7(a), the distorter 32 includes one or more serial electrical circulators 36 having an input to an input port 1 that circulates the electrical signal to an equalizer port 2. A resonator 38 can be connected to port 2 to serve as an all-pass transmission filter that reflects all incident power in a frequency dependent manner back to the port 2, thereby distorting signal. The distorted electrical signal $\Lambda_{ED}$ exits an output port 3 of the circulator 36 from which it can be passed into another distortion element or exit the signal distorter 32.

An example of resonators 38, which are suitable for use in the present invention are impedance resonators following the general equation:

$Z(s) = sL + 1/(sC)$ $L = RQ/(2\pi f_0)$ $C = 1/(4\pi^2 f_0^2 L)$ $H(s) = (Z(s)-R)/(Z(s)+R)$ $D(\omega) = -d/d\omega(arg(H(j\omega)))$, where

| | | |
|---|---|---|
| Z = impedance | C = capacitance | D ($\omega$) = group delay |
| L = inductance | $f_0$ = frequency | H (s) = equalizer |
| R = resistance | Q = Q factor | Transfer function |

Figure 7B:
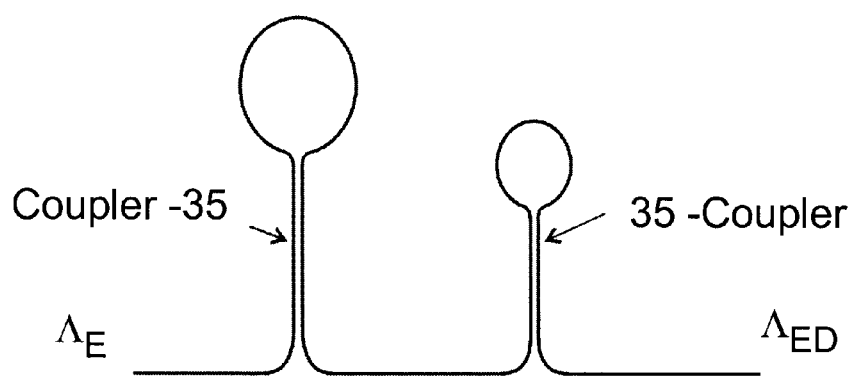
Figure 7C:
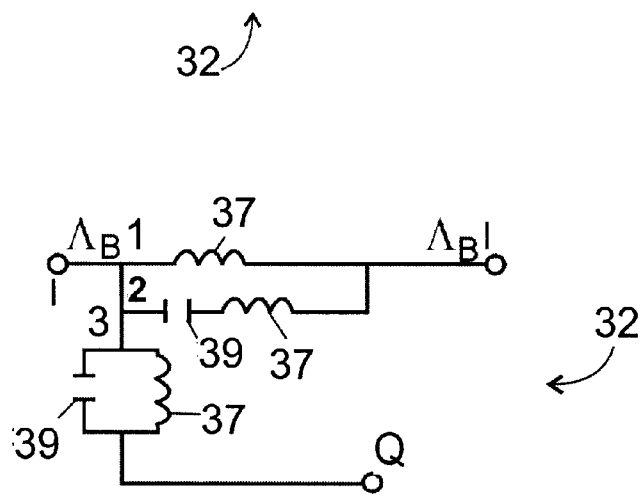

One skilled in the art will appreciate that the circulator/resonator embodiments shown in FIG. 7(a) can be cascaded to provide desired group delay characteristics and that other networks may be used in the present invention. For example, in FIG. 7(b), the signal distorter 32 includes one or more electrical loop couplers 35 configured to introduce the desired group delay into the electical carrier signal $\Lambda_e$. Various configurations of loop couplers suitable to achieve the desired group delay can be used in the distorter 32. FIG. 7(c) shows an embodiment of the signal distorter 32 for distorting the baseband signal $\Lambda_B$. The distorter 32 is used to separate the baseband signal $\Lambda_B$ into I and Q components by configuring the inductors 37 and capacitors 39 to approximate the following general transfer function over the frequency range of interest:

$|H_I(j\omega)|^2 + |H_Q(j\omega)|^2 = $ constant.

The amount of dispersion in optical fiber $\mathbf{16}_i$ is generally well documented as a function of fiber length and optical wavelength. For example, transmission fiber can typically be in the range of 15–20 ps/nm/km in the 1550 nm wavelength range. Thus, the amount of distortion necessary to produce a desired dispersion profile at a point in the optical transmission system can be calculated and adjusted as may be necessary in the system 10. In addition, the shape of the distortion profile can be tailored to be linear or nonlinear functions of frequency to compensate for the interrelation of chromatic dispersion and nonlinear interactions.

Figure 8A:
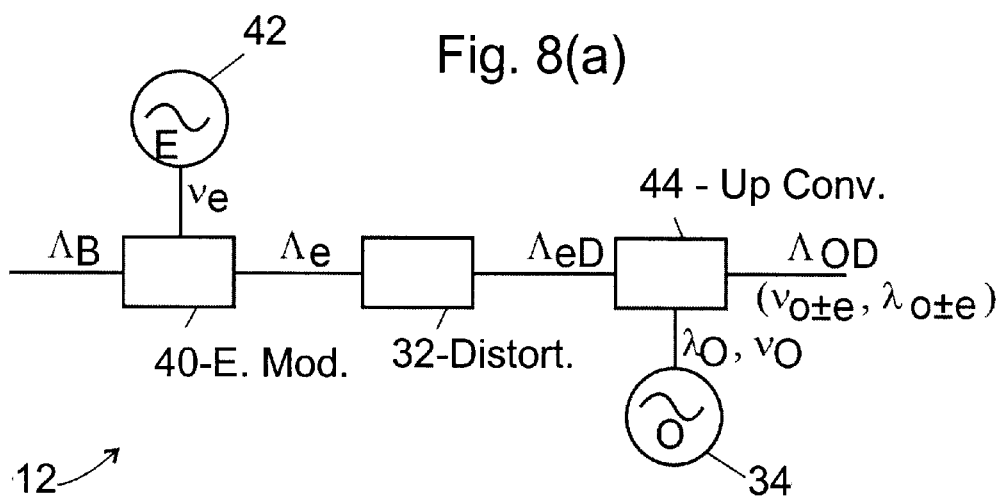
FIGS. 8–11 show embodiments of transmitters of the present invention

FIG. 8 shows an embodiment of the transmitter 12 in which an electrical modulator 40 is used to modulate the baseband electric signal $\Lambda_B$ onto an electrical carrier at a frequency $v_e$ from an electrical carrier source 42. The modulator 40 can be a double balanced mixer as is known in the art. The electrical carrier signal $v_e$ will be of the general form A(sin($\omega$+$\phi$)) and the baseband signal $\Lambda_E$ of the form V(t) resulting in an output signal of the general form kV(t)A(sin($\omega$+$\phi$+$\phi_1$)). Thus, if the mean of the baseband signal is zero, the carrier frequency will be suppressed. Likewise, if V(t) has essentially two state ±a, the output will be in PSK format.

The electrical carrier frequency can be any suitable frequency for the data rate being transmitted, for example, RF or microwave carriers. The signal distorter 32 receives the modulated electrical carrier signal $\Lambda_e$ at frequency $v_e$ and provides the distorted electrical carrier signal $\Lambda_{eD}$. An upconverter 44 combines the distorted modulated electrical carrier at $v_e$ with an optical lightwave carrier at a central wavelength $\lambda_o$ (frequency $v_o$) supplied by an optical source 34. The resulting distorted optical signal $\Lambda_{OD}$ has a frequency $v_o \pm v_e$ ("$v_{o\pm e}$") and central wavelength at $\lambda_{o\pm e}$, which is equal to $c/(v_o \pm v_e)$, where c is the speed of light.

Figure 8B:
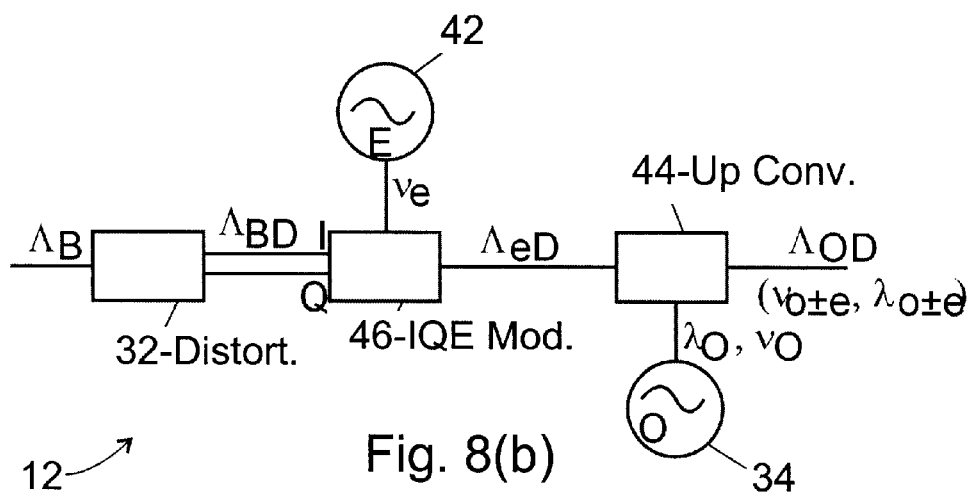
Figure 9:
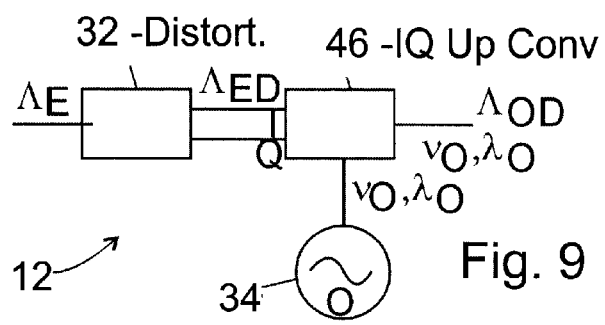

In embodiments shown in FIGS. 8(b) and 9, the baseband electrical signal $\Lambda_B$ is provided to the signal distorter 32, which is configured to separate the signal $\Lambda_B$ into in-phase ("I") and quadrature ("Q") components and distort the signal. The IQ components of the distorted electrical signal $\Lambda_{BD}$ are provided to an IQ modulator 46. In the FIG. 8(b) embodiments, the I and Q components are modulated onto the electrical carrier $v_e$ which is upconverted onto the optical carrier $v_o$ to produce the distorted optical signal $\Lambda_{OD}$ at the central wavelength at $\lambda_{o\pm e}$. In FIG. 9 embodiments, the I and Q components are modulated onto the optical carrier having a central wavelength $\lambda_o$ and frequency $v_o$ to provide the distorted optical signal $\Lambda_{OD}$ having the same central wavelength at $\lambda_o$.

Figure 10:
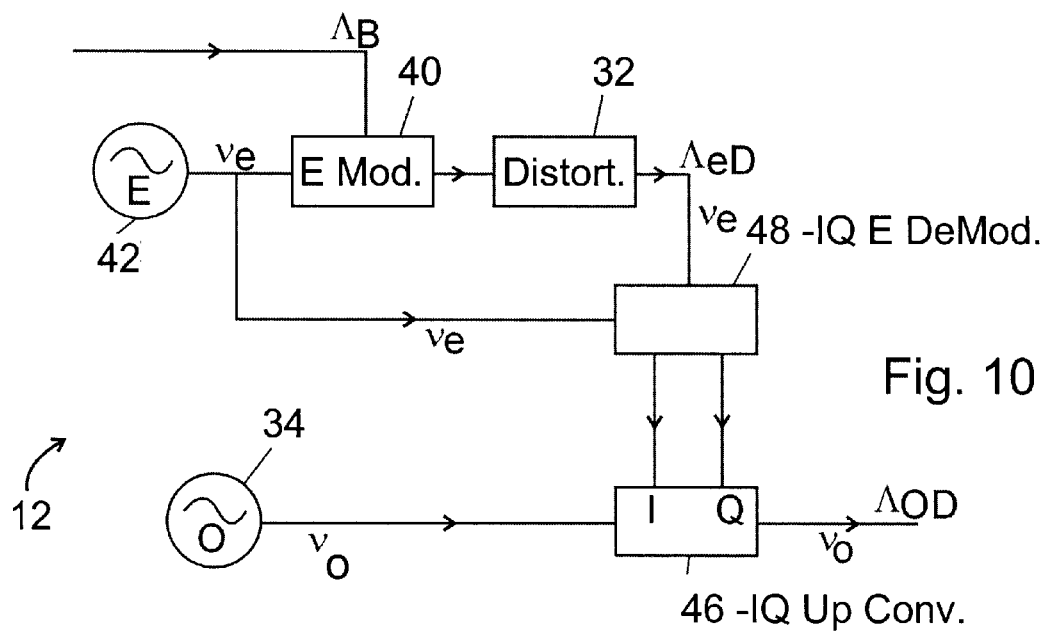

Conversely in FIG. 10, the baseband signal $\Lambda_B$ is modulated onto a portion of the electrical carrier $v_e$, which is passed through the signal distorter 32 to produce the distorted electrical signal $\Lambda_{eD}$. Another portion of the electrical carrier $v_e$ is provided as input along with the distorted electrical signal $\Lambda_{eD}$ to an IQ demodulator 48, which separates the distorted electrical signal $\Lambda_{eD}$ into its IQ components. The IQ components of the electronic signal are provided to the IQ modulator 46 which modulates the data onto the optical carrier at the central wavelength $\lambda_0$ and frequency $v_o$ provided by the optical source 34.

Figure 11:
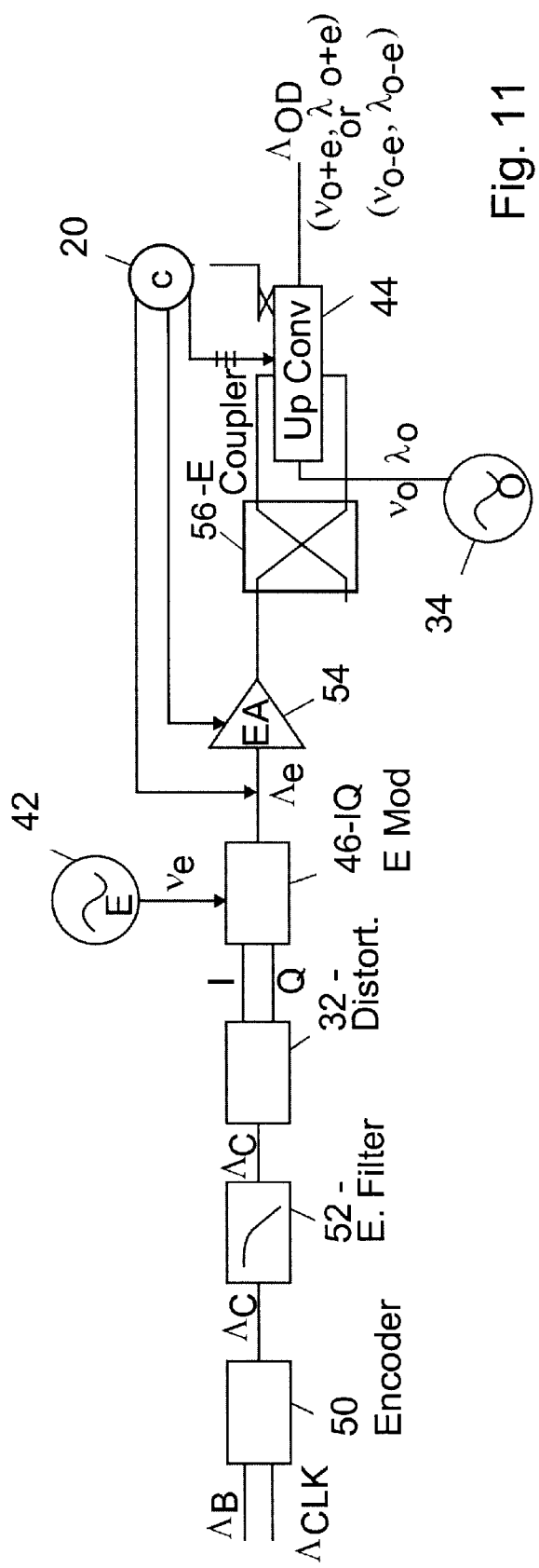

In the transmitter 12 of FIG. 11, the electrical baseband signal $\Lambda_B$ can be encoded along with a clock signal $\Lambda_{CLK}$ using a data encoder 50 to provide an encoded data signal $\Lambda_C$. The encoded data signal $\Lambda_C$ may be further passed through a filter 52, such as a low pass filter, to shape the signal before being passed to the signal distorter 32. In the transmitter 12 of FIG. 11, the IQ modulator 46 can be used to modulate the distorted electrical signal onto the electrical carrier frequency $v_e$. The electrical carrier can be amplified using an electrical amplifier 54, split through electrical coupler 56, and upconverted onto the optical carrier to produce the distorted optical signal $\Lambda_{OD}$ having its center wavelength at $\lambda_{o\pm e}$. One of the controllers 20 in the system 10 can be used to provide feedback control of the upconverter 44, as well as the other components such as the amplifier 54.

In embodiments of FIG. 11, the electrical coupler 56 is used to split the signal from each input path between two output paths and impart a phase shift, i.e. 90° in a 2×2 3 dB coupler, between signals on the respective output paths. The phase shift between the two output paths depends upon which input path the signal was introduced. Thus, the frequency of the resulting distorted optical signal $\Lambda_{OD}$ will be either $v_{o+e} = v_o + v_e$ or $v_{o-e} = v_o - v_e$ depending upon which input of the coupler 56 the electrical signals are introduced.

Data encoding techniques, such as duobinary, QPSK, and others, are useful to decrease the bandwidth of the resulting optical signal. These formats can also affect the extent of distortions that arise from signal dispersion and non-linear interaction between the signals. The detection of duobinary and other differential PSK-type signals using direct detection can be enhanced using an optical filter 58 before the receiver 14 in the optical system 10. The optical filter 58 can be matched, i.e., comparably shaped, to the received optical spectrum of the signal, which can be controlled in the present invention using the electrical filter 52. The optical filter 58 can be a Fabry-Perot filter or other appropriate filter as may be known in the art. The electrical filter 52 can be design to account for and match the properties of the optical filter 58 so as to minimize the bandwidth of the optical signal. It will be appreciated that the electrical filter 52 can be positioned at different locations within the transmitter 12 and modified accordingly.

Figure 12:
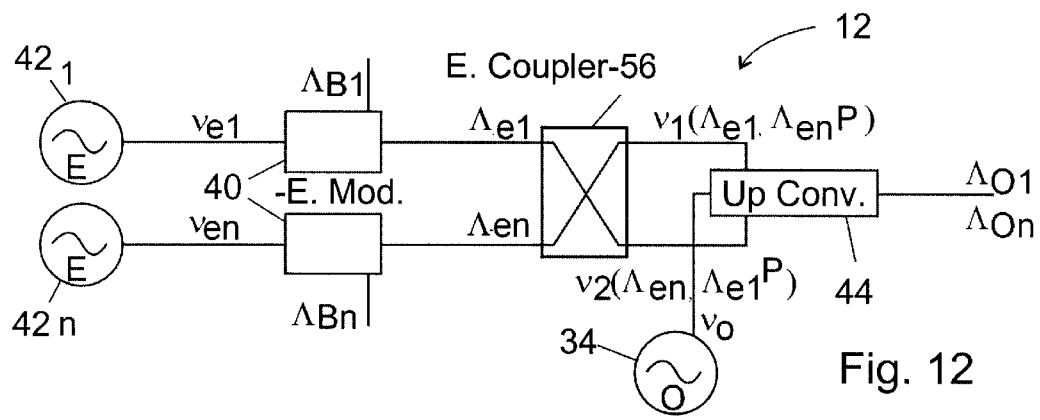
FIG. 12 shows an embodiment of transmitters of the invention.

In another aspect of the invention shown in FIG. 12, the transmitter 12 of the present invention can be used to simultaneously upconvert a plurality of electrical signals $\Lambda_{En}$ onto one optical carrier. A plurality of baseband electrical signals $\Lambda_{B1}$–$\Lambda_{Bn}$ are modulated onto a corresponding plurality on electrical carriers provided by sources 42$_1$–42$_n$ to provide modulated electrical carriers. Signal distorters 32 can be provided to distort either the baseband signal or the modulated electrical carrier, if dispersion compensation is desired. The modulated electrical carriers are passed through the electrical coupler 56, which divides the electrical signals between the two output paths leading to the upconverter 44.

Numerous combinations of electrical carriers can be upconverted using the transmitter configuration of FIG. 12. For example, electrical sources 42$_1$ through 42$_n$ can provide the same or different electrical carrier frequencies and depending upon how the carriers are coupled into the upconverter 44. If more than two electrical carriers are to be upconverted using the same upconverter 44, the additional carriers can be combined, or multiplexed, onto the appropriate coupler input. The resulting optical signal can be produced at longer or shorter wavelengths than the optical carrier wavelength $\lambda_0$ as previously discussed. In addition, it may also be possible to use one or more electrical subcarriers to carry additional data along with, or in lieu of, data on the electrical carrier frequency depending upon the electrical subcarrier frequency spacings.

Figure 13:
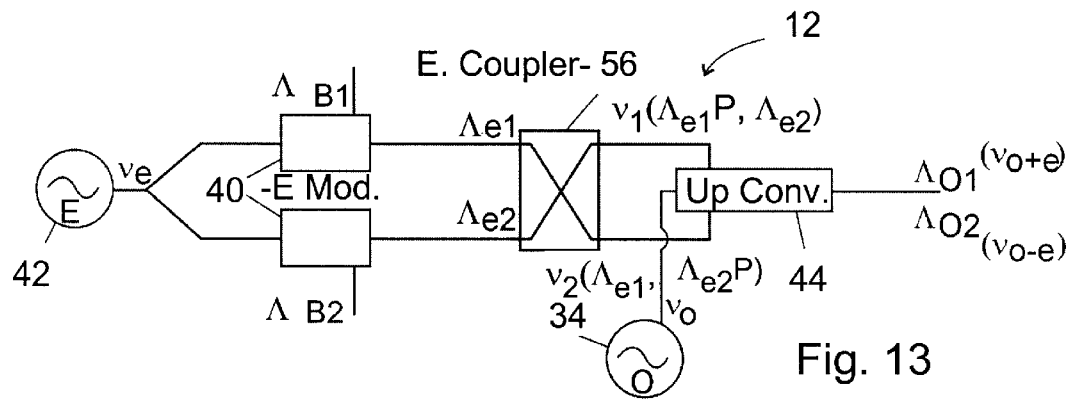
FIG. 13 shows an embodiment of upconverters of the present invention.

The upconverter 44 in embodiments of FIGS. 12 and 13 is configured to upconvert the electrical signal onto a single sideband subcarrier frequency, either $v_{o+e}$ or $v_{o-e}$, while suppressing the mirror image sideband subcarrier frequency. The upconverter can be operated without or with carrier wavelength suppression, although carrier suppression eliminates unwanted signals that could produce signal interference.

Figure 14:
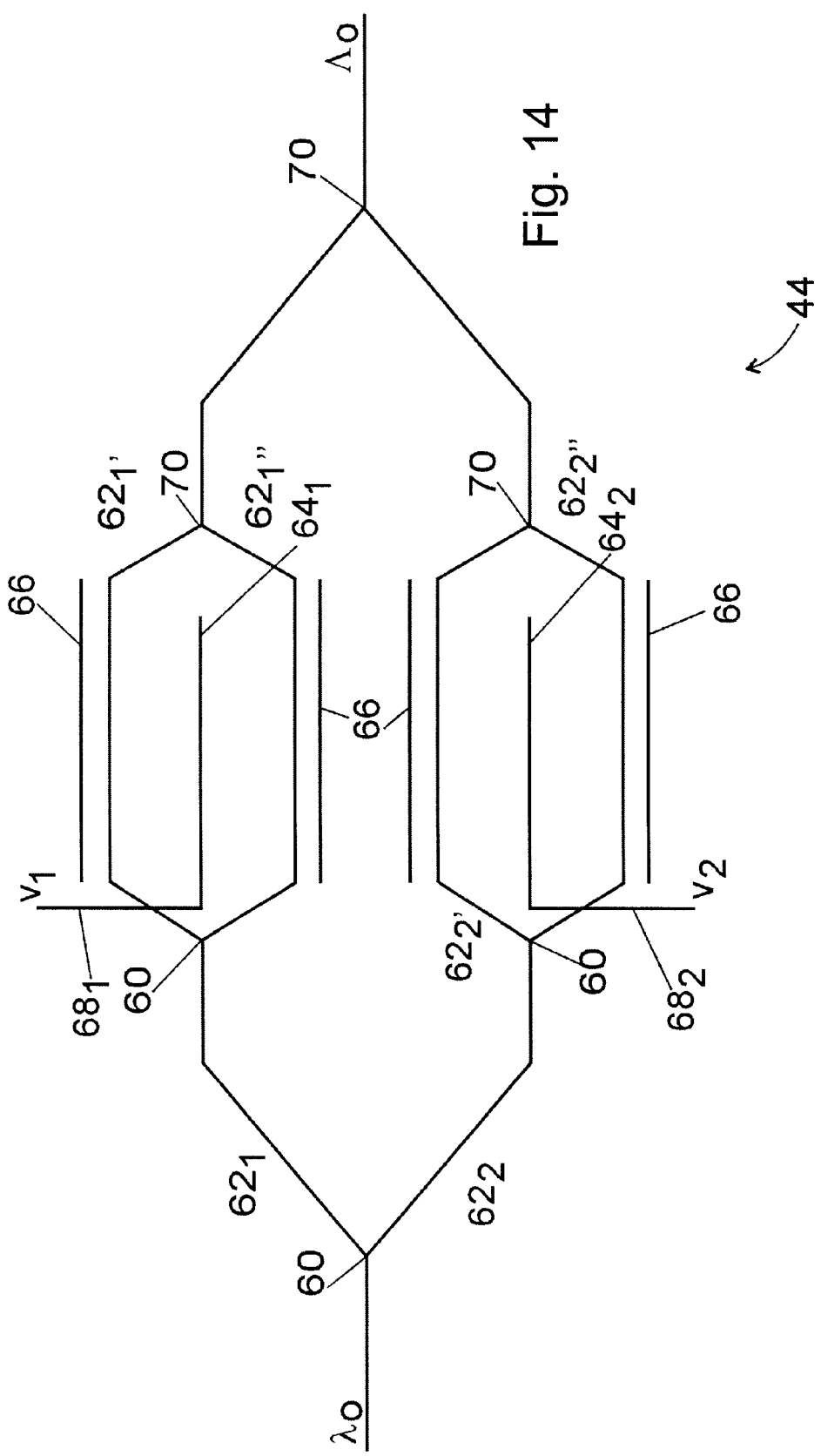
FIGS. 14–16 show embodiments of transmitters of the present invention.

FIG. 14 shows an embodiment of the single side band suppressed carrier upconverter 44 suitable for use in the present invention. Other suitable single side band embodiments include those described by Olshansky in U.S. Pat. Nos. 5,101,450 and 5,301,058, which are incorporated herein by reference. As shown in FIG. 14, the optical carrier lightwave at frequency $v_o$ is split using an optical splitter 60 into two respective optical paths, 62$_1$ and 62$_2$, which are further split into optical paths 62$_{1'}$ and 62$_{2''}$. The split lightwaves in optical paths 62$_1$ are passed between first upconverter input electrode 64$_1$ and a pair of ground electrodes 66. Likewise, the split lightwaves in optical paths 62$_2$ are passed between second upconverter input electrode 64$_2$ and a pair of ground electrodes 66. Electrical input signals $v_1$ and $v_2$ are provided to the upconverter respective input electrodes 64$_1$ and 64$_2$ via first and second inputs, 68$_1$ and 68$_2$, respectively. The input signals $v_1$ and $v_2$ are upconverted onto the respective split lightwaves passing between the electrodes and combined in cascaded optical combiners 70 to produce the upconverted optical signal $\Lambda_o$.

In an embodiment, $LiNbO_3$ is used to form the optical paths 62$_{i'}$ and 62$_{i''}$, which can be used to produce linearly polarized optical signals. In addition, bias electrodes can be provided in optical paths 62$_{i'}$ and 62$_{i''}$ and/or 62$_i$ after passing through the input electrodes 64$_1$ and 64$_2$. The bias electrodes can be used to trim the phase difference of the optical signals upconverted onto the subcarrier lightwaves in each path before the signals are combined.

The electrical input signals $v_1$ and $v_2$ introduced to the upconverter 44 carrying the same electrical data signal, except that the data signals have a relative phase shift between the first and second inputs, 68$_1$ and 68$_2$, according to the relation: $v_1 = v_2 \pm$ phase shift. The sign of the phase shift determines whether the electrical data signal will be upconverted onto lightwave subcarriers that are greater or less than the carrier frequency of the lightwave. Thus, the upconverter 44 can be configured to receive and simultaneously upconvert electrical signals at the same or different electrical frequencies onto different subcarrier lightwave frequencies of the same lightwave by introducing the appropriate phase shift between the electrical input signals. For example, in embodiments of FIGS. 12 and 13, 3 dB electrical couplers 56 provide a ±90° phase shift, which allows electrical signals to be upconverted onto optical frequencies that are greater or less than the carrier frequency. One skilled in the art will appreciate that other techniques for imparting the phase shift are suitable within the scope of the invention.

The transmitter 12 shown FIG. 13 provides a configuration that can be used to symmetrically place two different optical signals around the central wavelength $\lambda_0$ of the optical carrier. The electrical carrier 42 supplies the electrical carrier $v_e$ that is split into two paths, each of which is modulated using a corresponding modulator 36$_1$ or 36$_2$ with electrical baseband signals $\Lambda_{B1}$ and $\Lambda_{B2}$, respectively. The two signals are passed through the electrical coupler 56 which splits and couples the signals from each of the two coupler input paths to each of the two output paths. The coupler 56 introduces a 90° phase shift into the coupled portion of the signal, shown as $\Lambda_{e1}^P$ and $\Lambda_{e2}^P$ on FIGS. 12 and 13, to produce upconverter input signals $v_1$ and $v_2$. For example in FIG. 13, $v_1$ includes $\Lambda_{e1}^P$ and $\Lambda_{e2}$, whereas $v_2$ includes $\Lambda_{e1}$ and $\Lambda_{e2}^P$. The opposite phase shifts of $v_1$ and $v_2$ results in one of the two electrical signals being upconverted onto an optical subcarrier frequency $v_{o+e}$ and the other electrical signal is upconverted onto the optical subcarrier frequency $v_{o-e}$, symmetric to the optical carrier frequency $v_o$. A skilled art is an will recognize that distorted and undistorted optical signals can be produced using the embodiment of FIG. 13 and similar embodiments.

Figure 15:
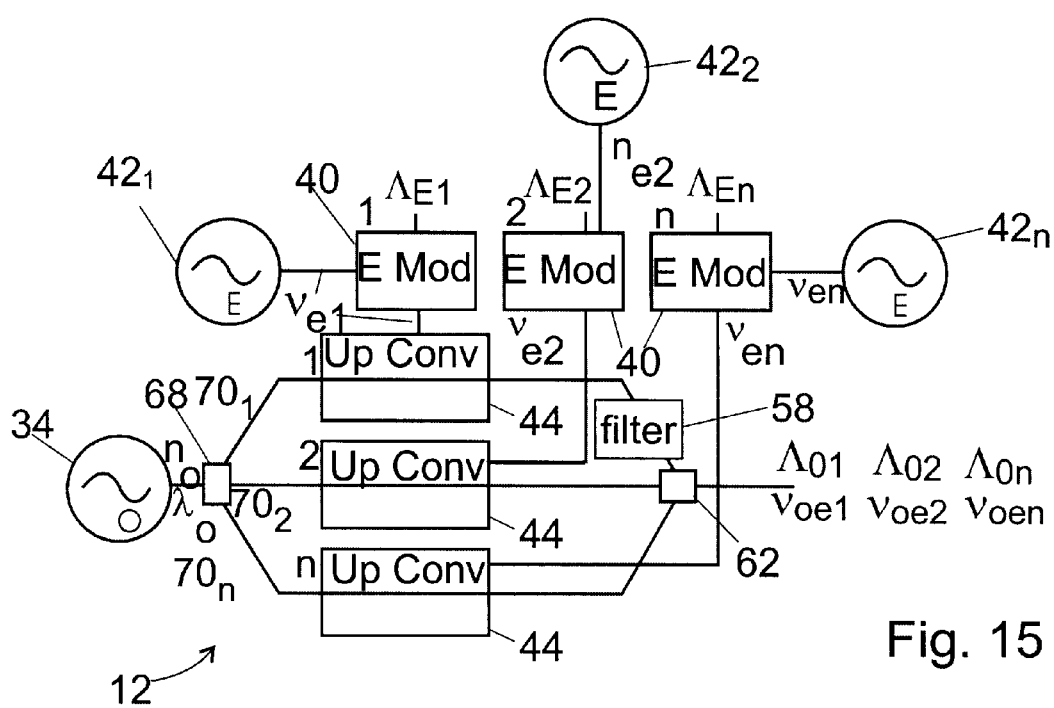

An embodiment of the transmitter 12, shown in FIG. 15, can be also used to provide control over proximate optical wavelengths by upconverting one or more electrical frequencies onto a plurality of optical carriers provided by the common optical source 34. The optical carrier lightwave is split using the optical splitter 60 into split lightwaves carried on a plurality of optical paths 62$_1$–62$_n$. A corresponding plurality of the upconverters 44$_{1-n}$ are disposed along the optical paths. A plurality of electrical baseband signal $\Lambda_{B1}$–$\Lambda_{Bn}$ are correspondingly modulated onto electrical carrier $v_{e1}$–$v_{en}$ via modulators 40$_{1-n}$. The electrical carrier signals $\Lambda_{e1}$–$\Lambda_{en}$ are provided to the upconverters 44$_{1-n}$ and converted to subcarrier lightwave optical signals $\Lambda_{o1}$–$\Lambda_{on}$ at frequencies $v_{oe1}$–$v_{oen}$ and combined using an optical combiner or multiplexer 68. When only one electrical signal is upconverted onto a split lightwave optical carrier in a path 62$_i$, single or double sideband upconverters, with or without carrier suppression, can be used in the invention. Optical filters 58 can be employed to remove any undesired remnant carrier wavelengths or mirror image sidebands that are output from the particular modulator used in the transmitter 12.

Figure 16:
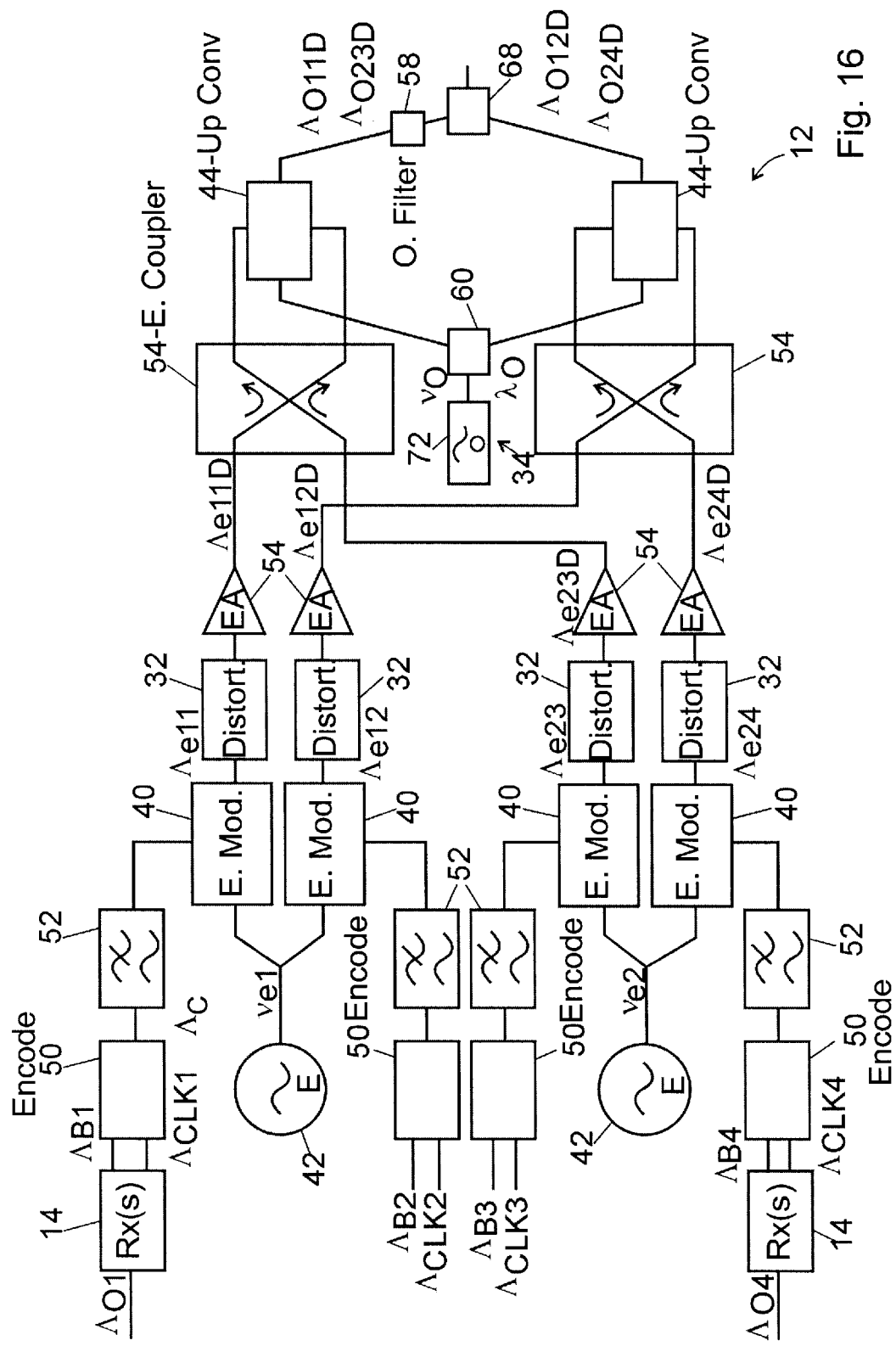

FIG. 16 shows an embodiment of the transmitter 12 that is configured to transmit four optical signals using a single optical source 34, such as a laser 72, emitting the optical carrier at a central wavelength $\lambda_0$ and frequency $v_0$. The baseband electrical signal $\Lambda_{B1}$–$\Lambda_{B4}$ are provided as input to corresponding data encoders 50$_{1-4}$ from an electrical transmission path or from the optical receiver 14 in a short or long reach optical system. The encoded electrical signal is passed through the shaping filter $52_{1-4}$ to respective electrical modulators 40. Encoded electrical signals $\Lambda_{C1}$–$\Lambda_{C2}$ and $\Lambda_{C3}$–$\Lambda_{C4}$ are modulated onto the electrical carrier at frequency $v_{e1}$ and $v_{e2}$, respectively. The modulated electrical signals $\Lambda_{e11}$–$\Lambda_{e24}$ are passed through respective signal distorters $32_{1-4}$ and electrical amplifiers $54_{1-4}$ to provide amplified distorted electrical signals $\Lambda_{e11D}$–$\Lambda_{e24D}$. Electrical signals $\Lambda_{e11D}$ and $\Lambda_{e23D}$ can be routed through electrical coupler $56_1$ to upconverter $44_1$. Likewise, electrical signals $\Lambda_{e12D}$ and $\Lambda_{e24D}$ can be routed through electrical coupler $54_2$ to upconverter $44_2$. The upconverted optical signals $\Lambda_{oe1D}$–$\Lambda_{oe4D}$ are combined in the combiner 62 prior to transmission. The interleaving of the electrical frequencies being upconverted allows for the use of optical filters 58, with either single or double sideband modulators, to remove any unwanted sidebands or carrier wavelengths from the optical signals $\Lambda_{oe1D}$–$\Lambda_{oe4D}$. Transmitters 12 of the present invention can also be used to modulate data onto the lightwave carrier wavelength, in addition to upconverting electrical frequency onto the lightwave.

In the present invention, transmitters 12 configured to provide multiple optical signals, can be further configured to impart opposite polarization to pairs of optical signals being generated by upconverting the electrical signals. For example, the optical combiner 62 in embodiments such as those shown in FIGS. 15 and 16 can be a polarizing component, such as a polarizing beam splitter/combiner. The orthogonal polarization of adjacent signals will reduce or eliminate nonlinear interaction between the signals, thereby providing for more closely spaced signal wavelengths and high power signals.

Figure 17:
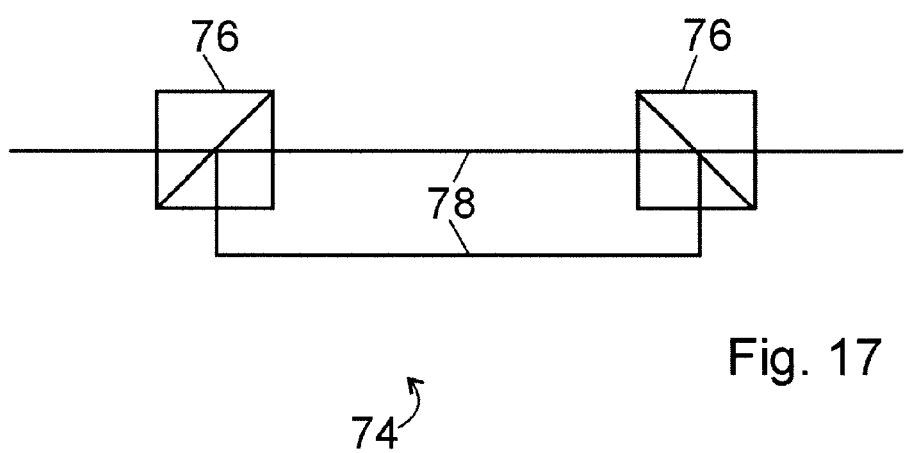
FIG. 17 shows a polarizing element of the present invention.

Alternatively, as shown in FIG. 17, a separate polarizing element 74 can be included in the combiner 62. An embodiment of the polarizing element 74 can includes two oppositely configured polarizing beam splitters 76 connected in series by two parallel paths 78 that produce a differential travel time between the splitters 76. The first beam splitter 76 splits the optical signal into two equal amplitude polarization components. The second beam splitter 76 is used to recombine the two polarization components. The time differential introduced by the parallel paths 78 can be established and/or controlled to introduce differences in the polarization of the channels. For example, optical signals having sufficiently narrow bandwidths can be introduced to the first beam splitter 76 at a 45° polarization angle to allow optical signal power to propagate equally in both paths 78. The resulting combined signals emerging from the second splitter 76 would be orthogonal if the time differential were equal to 1/(2*frequency difference between the signals). Similarly, polarization maintaining fiber can be used in lieu of the splitters 76 and parallel path 78 to introduce the time differential between the polarization components of a linearly polarized optical signal.

It will be appreciated that the present invention provides for optical systems having increasing the number of channels and the transmission performance of optical systems. Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. A polarization element, comprising:
   a polarization beam splitter having an input and first and second outputs, wherein an optical signal which includes first and second signal channels having a frequency difference and which enters the input is split into first and second amplitude polarization components, wherein the first polarization component is provided at the first output and the second polarization component is provided at the second output;
   a polarization beam combiner having a first and second inputs and an output;
   first and second optical waveguides, wherein the first optical waveguide optically couples the first output of the polarization beam splitter with the first input of the polarization beam combiner, and wherein the second optical waveguide optically couples the second output of the polarization beam splitter with the second input of the polarization beam combiner, and wherein a time differential equal to 1/(2 * the frequency difference between the first and second signal channels) is introduced between the first and second polarization components such that, when the first and second polarization components are combined, the first and second signal channels have orthogonal polarization.

2. The polarization element of claim 1, wherein the polarization beam splitter splits the optical signal into first and second equal amplitude polarization components.

3. The polarization element of claim 1, wherein the polarization beam splitter provides first and second polarization components having equal optical power.

4. The polarization element of claim 1, wherein the polarization beam splitter is oriented such that the optical signal is introduced on the input of the polarization beam splitter at a 45° polarization angle.

5. A polarization element, comprising:
   a polarization beam splitter having an input and first and second outputs, wherein an optical signal which includes a first plurality of signal channels and a second plurality of signal channels and which enters the input is split into first and second amplitude polarization components, wherein the first polarization component is provided at the first output and the second polarization component is provided at the second output;
   a polarization beam combiner having a first and second inputs and an output;
   first and second optical waveguides, wherein the first optical waveguide optically couples the first output of the polarization beam splitter with the first input of the polarization beam combiner, and wherein the second optical waveguide optically couples the second output of the polarization beam splitter with the second input of the polarization beam combiner, and wherein a time differential is introduced between the first and second polarization components such that, when the first and second polarization components are combined, the first plurality of signal channels has a polarization which is orthogonal to a polarization of the second plurality of signal channels.

6. The polarization element of claim 5, wherein:
   the optical signal includes first, second, third, and fourth signal channels;
   the first plurality of signal channels includes the first and third signal channels; and
   the second plurality of signal channels includes the second and fourth signal channels.

7. An optical communication system, comprising:
   an optical receiver;
   an optical transmitter including:

an upconverter having a first upconverter input and a second upconverter input, each input configured to receive one of first and second electrical data signals, the upconverter being configured to upconvert the first and second electrical data signals onto corresponding first and second subcarrier frequencies of a lightwave having a carrier frequency to produce an optical signal at an upconverter output, wherein one of the corresponding subcarrier frequencies is greater than the carrier frequency and one of the corresponding subcarrier frequencies is less than the carrier frequency;

a polarization beam splitter having an input connected to the upconverter output and having first and second outputs, wherein the optical signal which includes first and second signal channels and which enters the input is split into first and second amplitude polarization components, wherein the first polarization component is provided at the first output and the second polarization component is provided at the second output;

a polarization beam combiner having first and second inputs and an output; and first and second optical waveguides, wherein the first optical waveguide optically couples the first output of the polarization beam splitter with the first input of the polarization beam combiner, and wherein the second optical waveguide optically couples the second output of the polarization beam splitter with the second input of the polarization beam combiner, and wherein a time differential is introduced between the first and second polarization components such that, when the first and second polarization components are recombined, the first and second signal channels are orthogonally polarized; and an optical waveguide optically coupling the transmitter to the receiver.

8. The system of claim 7, further comprising:

an electrical carrier source configured to provide first and second electrical carriers at the same frequency; and, a first electrical modulator configured to modulate a first baseband signal onto the first electrical carrier to produce the first electrical data signal;

a second electrical modulator configured to modulate a second baseband signal onto the second electrical carrier to produce the second electrical data signal.

9. The system of claim 8, further comprising:

a first signal distorter configured to distort the first electrical data signal to compensate for chromatic dispersion of the optical data signal carrying data from the first electrical data signal; and a second signal distorter configured to distort the second electrical data signal to compensate for chromatic dispersion of an optical data signal carrying data from the second electrical data signal.

10. The system of claim 7, wherein the transmitter includes:

an optical source having an output;

an upconverter having an optical input connected to the output of the optical source, first and second electrical inputs, and an optical output connected to the input of the polarization beam splitter;

at least one electrical carrier source having first and second outputs;

a first electrical modulator having a carrier input connected to the first output of the at least one electrical carrier source, having a baseband input, and having an output;

a second electrical modulator having a carrier input connected to the second output of the at least one electrical carrier source, having a baseband input, and having an output;

an electrical coupler having first and second inputs and first and second outputs, wherein the first input is connected to the output of the first electrical modulator, the second input is connect to the output of the second electrical modulator, the first output is connected to the first electrical input of the upconverter, and the second output is connected to the second electrical input of the upconverter.

11. The system of claim 10, wherein the electrical coupler is a 3 dB coupler.

12. The system of claim 11, wherein the system includes a plurality of upconverters.

13. The system of claim 12, wherein the system includes a plurality of electrical couplers.

14. A method of polarizing first and second channels having a frequency difference in an optical signal, comprising:

splitting the optical signal into first and second amplitude polarization components;

introducing a time differential between the first and second polarization components equal to approximately 1/(2 * the frequency difference between the first and second signal channels); and combining the first and second polarization components to form a signal including the first and second channels with orthogonal polarization.

15. The method of claim 14, wherein splitting includes splitting the optical signal into first and second equal amplitude polarization components.

16. The method of claim 14, wherein splitting includes providing the first and second polarization components having equal optical power.

17. The method of claim 14, further comprising orienting the optical signal at a 45° polarization angle before splitting the optical signal.

* * * * *